(12) United States Patent
Favalora et al.

(10) Patent No.: US 11,243,450 B2
(45) Date of Patent: Feb. 8, 2022

(54) SAW MODULATOR HAVING OPTICAL POWER COMPONENT FOR EXTENDED ANGULAR REDIRECTION OF LIGHT

(71) Applicant: The Charles Stark Draper Laboratory, Inc., Cambridge, MA (US)

(72) Inventors: Gregg E. Favalora, Bedford, MA (US); Michael G. Moebius, Somerville, MA (US); Steven J. Byrnes, Watertown, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 121 days.

(21) Appl. No.: 16/150,929

(22) Filed: Oct. 3, 2018

(65) Prior Publication Data

US 2019/0033684 A1 Jan. 31, 2019

Related U.S. Application Data

(63) Continuation-in-part of application No. 15/883,811, filed on Jan. 30, 2018.

(60) Provisional application No. 62/567,451, filed on Oct. 3, 2017, provisional application No. 62/452,281, filed on Jan. 30, 2017, provisional application No. 62/453,041, filed on Feb. 1, 2017, provisional application No. 62/468,455, filed on Mar. 8, 2017.

(51) Int. Cl.
 *G02F 1/335* (2006.01)
(52) U.S. Cl.
 CPC ........ *G02F 1/335* (2013.01); *G02F 2201/305* (2013.01); *G02F 2201/34* (2013.01)

(58) Field of Classification Search
 CPC . G02F 1/335; G02F 2201/34; G02F 2201/305
 USPC .......................................................... 359/285
 See application file for complete search history.

(56) References Cited

U.S. PATENT DOCUMENTS

| | | | | |
|---|---|---|---|---|
| 3,874,782 A | * | 4/1975 | Schmidt | G02F 1/011 385/8 |
| 4,067,641 A | * | 1/1978 | Holton | G02B 6/30 385/131 |
| 4,084,130 A | * | 4/1978 | Holton | G02B 6/30 257/E27.12 |
| 4,443,696 A | * | 4/1984 | Taboada | G02B 26/02 250/205 |
| 4,946,253 A | * | 8/1990 | Kostuck | G02B 5/32 359/15 |

(Continued)

OTHER PUBLICATIONS

Davis, S.R., et al., "Analog, Non-Mechanical Beam-Steerer with 80 Degree Field of Regard," Proc. of SPIE, 6971, 69710G-1-69710G-11, (2008).

(Continued)

*Primary Examiner* — Kaveh C Kianni
(74) *Attorney, Agent, or Firm* — HoustonHogle LLP

(57) ABSTRACT

A light field generator system including a leaky-mode SAW modulator is disclosed. The modulator incorporates at least one optical power component, such as a concave mirror or volume grating having a non-zero diopter rating. In some embodiments, the system incorporates the at least one optical power component by embedding the optical power component within a substrate of the SAW modulator and/or by placing the optical power component upon a surface of the SAW modulator.

17 Claims, 13 Drawing Sheets

(56) References Cited

U.S. PATENT DOCUMENTS

| | | | | |
|---|---|---|---|---|
| 5,131,060 | A * | 7/1992 | Sakata | G02F 1/3133 257/184 |
| 5,504,772 | A * | 4/1996 | Deacon | H01S 3/063 372/102 |
| 5,717,510 | A * | 2/1998 | Ishikawa | H04B 10/0795 398/147 |
| 6,167,169 | A * | 12/2000 | Brinkman | G02F 1/011 385/10 |
| 7,058,261 | B2 * | 6/2006 | Ghiron | G02B 6/12007 385/30 |
| 8,873,131 | B2 * | 10/2014 | Han | G03H 1/2294 359/305 |
| 9,508,377 | B2 * | 11/2016 | Yamazaki | G11B 20/18 |
| 9,613,886 | B2 * | 4/2017 | Lin | H01L 23/60 |
| 10,149,958 | B1 * | 12/2018 | Tran | G16H 20/30 |
| 10,156,725 | B2 * | 12/2018 | TeKolste | G02B 6/0025 |
| 10,365,434 | B2 * | 7/2019 | Wang | G01N 21/774 |
| 2002/0141039 | A1 * | 10/2002 | Mermelstein | G02F 1/125 359/305 |
| 2003/0026512 | A1 * | 2/2003 | Deliwala | G02B 6/10 385/2 |
| 2005/0238277 | A1 * | 10/2005 | Wang | A61B 1/0684 385/8 |
| 2006/0028727 | A1 * | 2/2006 | Moon | G06K 19/06009 359/569 |
| 2008/0138013 | A1 * | 6/2008 | Parriaux | G02B 5/1814 385/37 |
| 2008/0239420 | A1 * | 10/2008 | McGrew | G02B 5/1828 359/11 |
| 2008/0278722 | A1 * | 11/2008 | Cunningham | G01N 33/582 356/317 |
| 2013/0050788 | A1 * | 2/2013 | Maeng | G03H 1/2294 359/10 |
| 2013/0320190 | A1 * | 12/2013 | Chu | G01J 1/0414 250/205 |
| 2014/0055692 | A1 * | 2/2014 | Kroll | G02F 1/292 349/15 |
| 2014/0104665 | A1 * | 4/2014 | Popovich | G02B 27/0103 359/15 |
| 2014/0300694 | A1 | 10/2014 | Smalley et al. | |
| 2014/0300695 | A1 * | 10/2014 | Smalley | G03H 1/02 348/40 |
| 2016/0223988 | A1 * | 8/2016 | Bove, Jr. | G03H 1/2294 |
| 2016/0286204 | A1 * | 9/2016 | Grata | G02B 5/32 |
| 2018/0074457 | A1 * | 3/2018 | Jolly | G02F 1/332 |
| 2018/0364482 | A1 * | 12/2018 | Georgiou | G02B 27/0172 |
| 2019/0025666 | A1 * | 1/2019 | Byrnes | G03H 1/2294 |
| 2019/0025667 | A1 * | 1/2019 | Byrnes | G02B 30/50 |
| 2019/0302569 | A1 * | 10/2019 | Favalora | G02F 1/335 |
| 2021/0003968 | A1 * | 1/2021 | Bove, Jr. | |

OTHER PUBLICATIONS

Shokooh-Saremi, M., et al., "Particle Swarm Optimization and Its Application to the Design of Diffraction Grating Filters," Opt. Lett., 32(8): 894-896 (2007).

Aieta, F., et al., "Multiwavelength achromatic metasurfaces by dispersive phase compensation," Science, 347 (6228): 1342-1345 (2015).

Byrnes,S., et al., "Designing large, high-efficiency, high-numerical-aperture, transmissive meta-lenses for visible light." Opt. Exp. 24 (5): 5110-5124 (2016).

Fattal, D. et al., "A multi-directional backlight for a wide-angle, glasses-free three-dimensional display," Nature, 495: 348-351 (2013).

Geng, J., "Three-Dimensional Display Technologies," Advances in Optics and Photonics, 5: 456-535 (2013).

Hinkov, V.P., et al., "Collinear Acoustoopitcal TM-TE Mode Conversion in Proton Exchanged Ti: LiNbO3 Waveguide Structures," J. Lighwave Tech., 6(6): 903-908 (1988).

"Anti-Reflective Coating," https://en.wikipedia.org/wiki/Anti-reflective_coating; 1-9 (2017/2019).

"Allied High Tech—Grinding Equipment System," https://www.alliedhightech.com/equipment/grinding-polishing, 1-2 (2017/2019).

International Search Report and Written Opinion of the International Searching Authority, dated Apr. 12, 2018, from International Application No. PCT/US2018/015928, filed on Jan. 30, 2018. 15 pages.

International Search Report and Written Opinion of the International Searching Authority, dated June 6, 2018, from International Application No. PCT/US2018/015930, filed on Jan. 30, 2018. 21 pages.

Jolly, S., et al., "Computation of Fresnel holograms and diffraction-specific coherent panoramagrams for full-color holographic displays based on leaky-mode modulators," Proc. SPIE Practical Holography XXIX, 9386, 93860A (2016).

Jolly, S., et al., "Near-to-eye electroholography via guided-wave acousto-optics for augmented reality," Proc. of SPIE vol. 10127 (2017).

Jolly, S., et al., "Progress in Transplant Flat-Panel Holographic Displays Enabled by Guided-Wave Acousto-Optics," Proc. of SPIE, 10558: 105580L-1-105580L-7 (2018).

Kihm, H., et al., "Nonparaxial Fresnel Diffraction from Oblique End Facets of Optical Fibers," Proc. Of SPIE, 5688: 517-524 (2004).

Kogelnik, H., "Coupled Wave Theory for Thick Hologram Gratings," Bell System Technical Journal, 48(9), 2909-2947 (1969).

Kulick, J.H., et al., Partial pixels: A Three-Dimensional Diffractive Display Architecture,' Josa A, 12(1), 73-83 (1995).

Lin, A., et al., "Optimization of random diffraction gratings in thin-film solar cells using genetic algorithms," Solar Energy Materials and Solar Cells, 92(12): 1689-1696 (2008).

Lucente, M., "Computational Holographic Bandwidth Compression," IBM Systems Journal, 35(3&4): 349-365 (1996).

Maines, J.D., et al., "Surface-Acoustic-Wave Devices for Signal Processing Applications," Proceedings of the IEEE, 64(5): 639-652 (1976).

Matteo, A.M., et al., "Collinear Guided Wave to Leaky Wave Acoustooptic Interactions in Proton-Exchanged LiNbO3 Waveguides," IEEE Trans. Ultrasonics, Ferroelectrics, and Frequency Control, 47(1): 16-28 (2000).

McLaughlin, S., et al., "Optimized Guided-to-Leaky-Mode Device for Graphics Processing Unit Controlled Frequency Division of Color," Applied Optics, 54(12): 3732-3736 (2015).

Onural, L., et al., "New High-Resolution Display Device for Holographic Three-Dimenstional Video: Principles and Simulations," Optical Engineering, 33(3): 835-844 (1994).

Pan, Y., et al., "A Review of Dynamic Holographic Three-Dimensional Display: Algorithms, Devices, and Systems," IEEE Trans. Industrial Informatics, 12(4): 1599-1610 (2016).

Plesniak, W., et al., "Reconfigurable image projection holograms," Optical Engineering 45(11): 115801-1-115801-15 (2006).

Qaderi, K., et al., "Leaky-Mode Waveguide Modulators with High Deflection Angle for Use in Holographic Video Displays," Optic Express, 24(18): 20831-20841 (2016).

Qing, L., et al., "Crowding clustering genetic algorithm for multimodal function optimization," Appl. Soft Computing, 8(1): 88-95 (2008).

Ryu, G., et al., "Development of Acoustic-Optic (AO) SLM Applicable to 3D Holographic Display," Transducers, 1979-1982 (2017).

Savidis, N., et al., "Progress in fabrication of waveguide spatial light modulators via femtosecond laser micromachining," Proc. of SPIE vol. 10115 (2017).

Smalley, D.E., et al., "Anisotropic Leaky-Mode Modulator for Holographic Video Displays," Nature, 498: 313-318 (2013).

Smithwick, Q., et al., "Interactive holographic stereograms with accommodation cues," Practical Holography XXIV: Materials and Applications, ed. Hans I. Bjelkhagen and Raymond K. Kostuk, SPIE (2010).

St. Hilaire, P., "Scalable Optical Architecture for Electronic Holography," Optical Engineering, 34(10): 2900-2911 (1995).

Stone, T., et al., "Hybrid Diffractive-Refractive Lenses and Achromats," Applied Optics, 27(14): 2960-2971 (1988).

Taillaert, D., et al., "Grating Couplers for Coupling between Optical Fibers and Nanophotonic Waveguides," Japanese Journal of Applied Physics, 45(8A): 6071-6077 (2006).

(56) References Cited

OTHER PUBLICATIONS

Tsai, C.S., et al., "Guided-Wave Two-Dimensional Acousto-Optic Scanner Using Proton-Exchanged Lithium Niobate Waveguide," Fiber and Integrated Optics, 17: 157-166 (1998).
Wilson, M.G.F., et al., "Theory of curved diffraction gratings," IEEE Proceedings, 127(3): 127-132 (1980).
Yamaguchi, M., "Light-Field and Holographic Three-Dimensional Displays [Invited]," J. Optical Society of America, 33(12): 2348-2364 (2016).
Zhou, G., et al. "Genetic Local Search Algorithm for Optimization Design of Diffractive Optical power components," Applied Optics, 38(20): 4281-4290 (1999).
Zicker, W., et al., "Antialiasing for Automultiscopic 3D Displays," Eurographic Symposium on Rendering (2006).

* cited by examiner

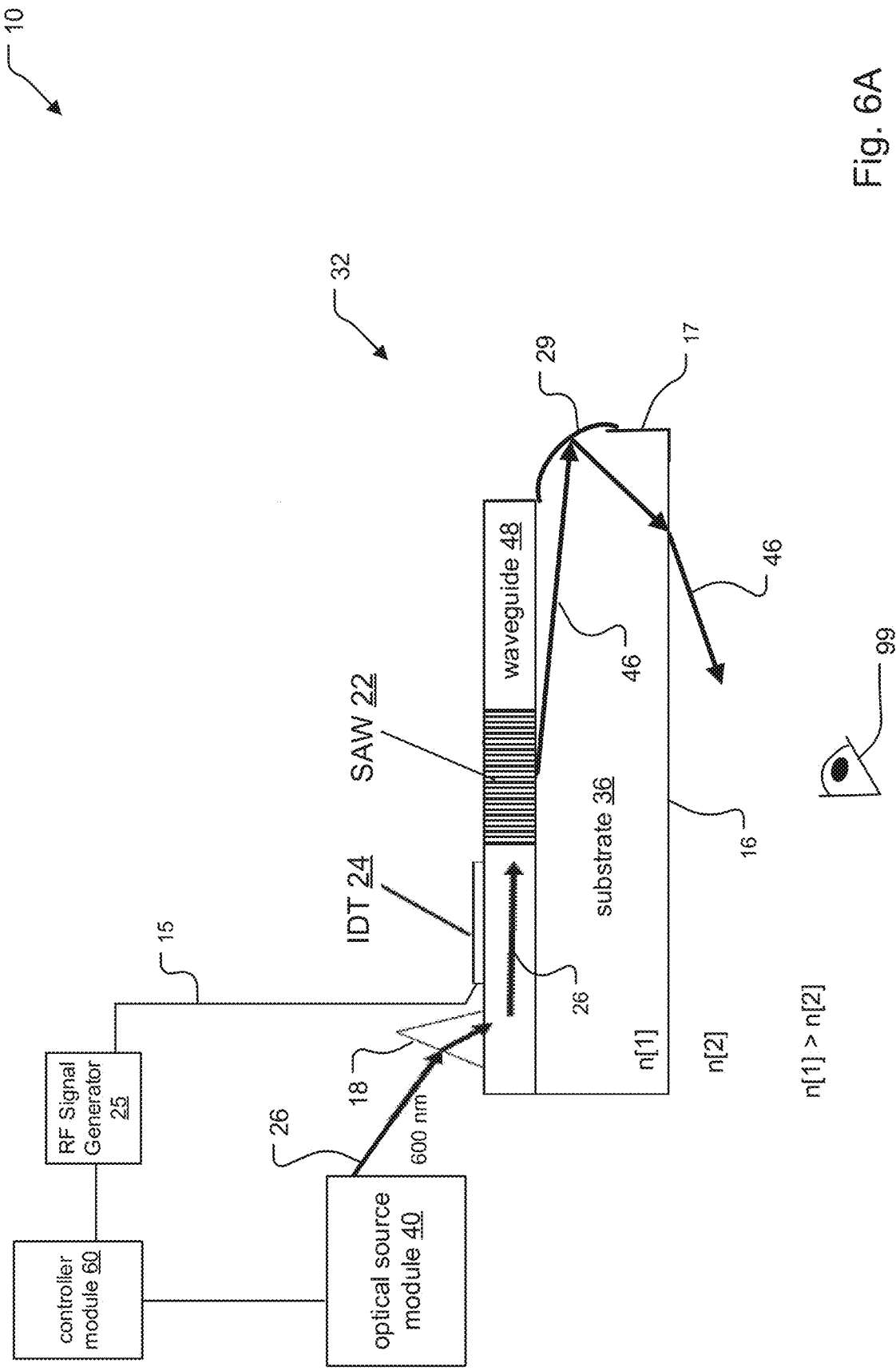

SAW MODULATOR HAVING OPTICAL POWER COMPONENT FOR EXTENDED ANGULAR REDIRECTION OF LIGHT

RELATED APPLICATIONS

This application claims the benefit under 35 USC 119(e) of U.S. Provisional Application No. 62/567,451, filed on Oct. 3, 2017, which is incorporated herein by reference in its entirety. This application is also a Continuation-in-Part of U.S. patent application Ser. No. 15/883,811, filed on Jan. 30, 2018, which claims the benefit under 35 USC 119(e) of U.S. Provisional Application No. 62/452,281, filed Jan. 30, 2017, U.S. Provisional Application No. 62/453,041, filed Feb. 1, 2017, and U.S. Provisional Application No. 62/468,455, filed on Mar. 8, 2017, which are incorporated herein by reference in their entirety.

BACKGROUND OF THE INVENTION

Acousto-optic modulators (ROMs) are a type of diffractive modulator that uses diffraction to direct light. They show promise as components of light display systems for generating light fields as are required for holographic displays and other applications such as metrology. One class of AOMs are termed surface acoustic wave (SAW) optical modulators. These modulators can steer light to provide controllable sub-holograms from which a light field can be constructed.

One type of SAW modulator is the guided-to-leaky-mode device fabricated using lithium niobate as described, for example, in Hinkov et al., *Collinear Acoustooptical TM-TE Mode Conversion in Proton Exchanged Ti:LiNbO3 Waveguide Structures*, J. Lightwave Tech., vol. 6(6), pp. 900-08 (1988), Smalley et al., Anisotropic leaky-mode modulator for holographic video displays, Nature, vol. 498, pp. 313-317 (2013); McLaughlin et al., *Optimized guided-to-leaky-mode device for graphics processing unit controlled frequency division of color*, Appl. Opt., vol. 54(12), pp. 3732-36 (2015), Qaderi et al. *Leaky-mode waveguide modulators with high deflection angle for use in holographic video displays*, Opt. Expr., vol. 24(18), pp. 20831-41 (2016), *Progress in fabrication of waveguide spatial light modulators via femtosecond laser micromachining*, Proc. of SPIE Vol. 10115, 2017, and U.S. Pat. Appl. Pub. No. US 2014/0300695 A1 by Smalley and Bove.

In these SAW modulators, surface acoustic waves (SAWs) diffract light propagating in the modulators' waveguides and cause at least some of the light to change from guided modes to leaky modes that exit the waveguides at angles dictated in part by the frequency of the light and the frequency of the SAWs.

A benefit of SAW-based light field generators is that they can be designed to project light of various intensities as a function of angle, even simultaneously, for each emissive region. This is different than the majority of 3-D display technologies, such as lenticular and integral photography displays, which use spatial multiplexing: each display pixel is divided into subpixels with different emission directions, disadvantageously trading off spatial resolution and direction resolution.

SUMMARY OF THE INVENTION

Current approaches for expanding the useful field of view of AOMs and specifically SAW modulator-based light field generator systems have limitations. One approach might be to increase the bandwidth of radio frequency (RF) drive signals applied to SAW modulators. This correspondingly creates Surface Acoustic Waves (SAWs) of an increasingly broader spectral range within the SAW modulators, which diffract the light at a wider range of angles to create wider fields of view. Increasing the RF bandwidth, however, typically provides only nominal increases. According to another approach, SAW modulators are arranged in pairs to double the field of view as compared to unitary configurations of SAW modulators. However, twice as many SAW modulators are required to produce the desired range of emitted light, which increases cost, and limits the compactness of displays. Moreover, additional interconnections and control signaling between the pairs of SAW modulators are required, which increases complexity.

The present invention concerns AOMs and more specifically SAW modulators and the light steering and field generator systems including these devices. The systems and/or the modulators employ at least one optical element acting with optical power. A power optical element is said to "act with optical power" when it is constructed to have a non-zero diopter rating.

In examples, the optical power component is a curved mirror or has volume features including reflective, refractive, or diffractive optical structures. Examples include volume diffraction gratings and volume holographic optical elements. The optical power component is incorporated within the system by either embedding the optical power component within the substrate of the modulator, or by placing/mounting/forming the optical power component upon a surface of the modulator, in examples.

Modulators that incorporate optical power components have advantages. The optical power components can broaden the otherwise limited native optical redirection capability compared with current modulators. The optical power components can further beneficially redirect the outgoing light so that it is within the SAW modulator's total internal reflection (TIR) exit cone. Such a capability also expands the useful field of view of the SAW modulator.

In general, according to one aspect, the invention features a SAW modulator, which includes at least one optical power component.

The optical power component might be embedded within a substrate of the SAW modulator or is placed upon, mounted to, and/or fabricated in a surface of the SAW modulator.

Further, the optical power component might have the function of a concave mirror or convex mirror or refractive lens.

In implementations, the optical power component might be a volume grating, volume holographic optical element, reflective surface grating, or a mirror coated curved surface of the modulator's substrate.

The optical power component can be used to direct light out of a distal face or a proximal face of the modulator.

Typically, the optical power component has a power in the range of $+/-100$ to $+/-10,000$ diopters.

In general, according to another aspect, the invention features a SAW modulator light field generator system. It comprises a substrate, series of optical modulators integrated side-by-side in the substrate; and at least one optical power component for directing light from optical modulators.

Each optical power component might extend across all of the modulators in the substrate. Moreover, there might be two or more optical power components located along the length of the optical modulators.

In general, according to another aspect, the invention features a method for generating a light field. The method comprises generating radio frequency drive signals, diffracting light from waveguides of optical modulators integrated in a substrate by generating surface acoustic waves from the radio frequency drive signals; and expanding a range of exit angles of light from the substrate with at least one optical power component.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6A is a schematic side view of a SAW modulator including a concave optical power component that is formed on a mirror-coated curved end face of the modulator's substrate;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well; unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
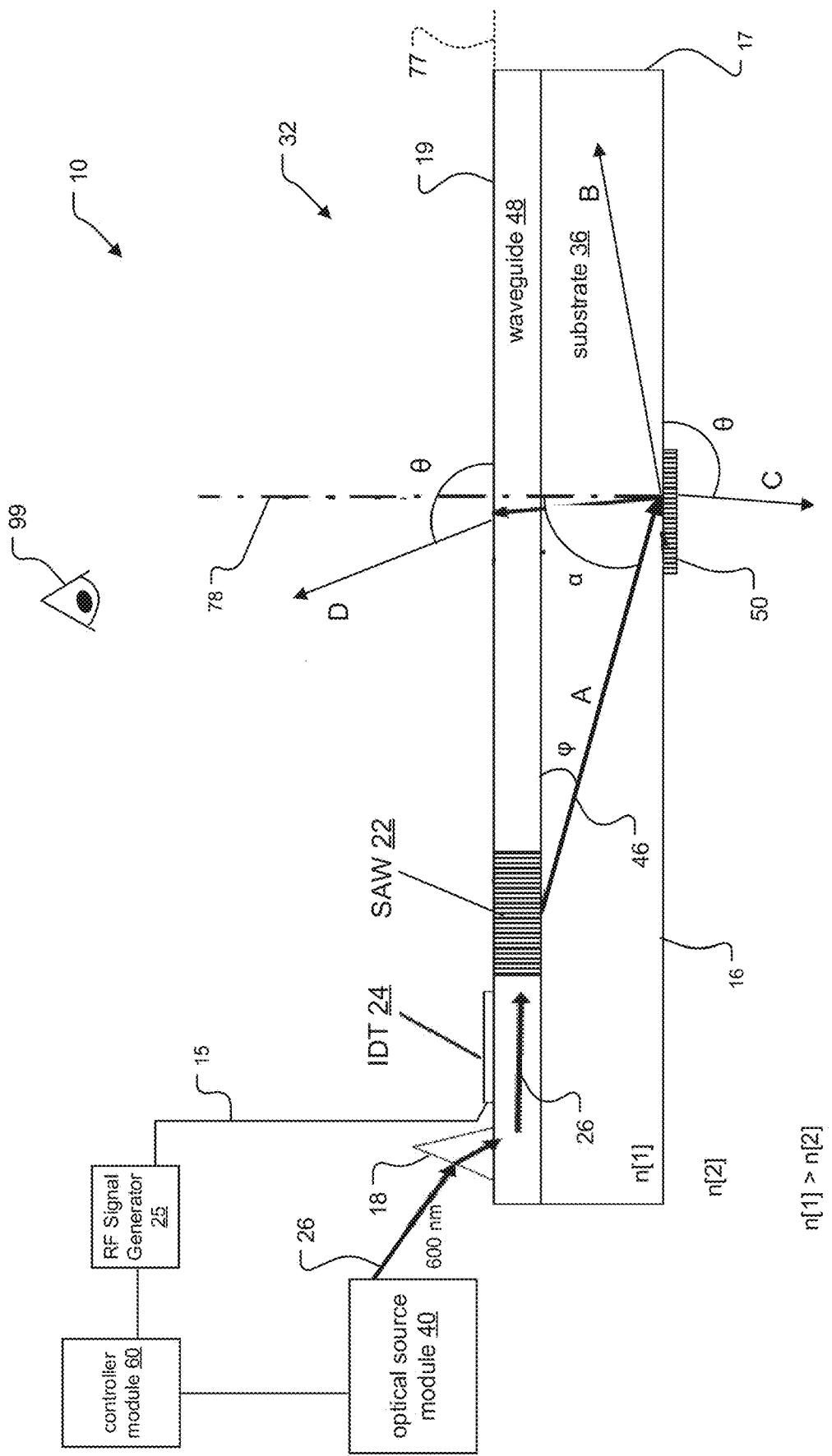
FIG. 1 is a schematic side view of a leaky-mode SAW modulator that illustrates several limitations associated with the devices.

FIG. 1 shows a side view of a leaky-mode SAW modulator 32 within a light steering system 10. It illustrates the general construction and operation of the SAW modulator, and why solely varying the RF drive signal frequency might not be the best approach to changing the angle at which the light is emitted from the modulator 32.

Concerning construction, the SAW modulator 32 is formed from a substrate 36 that is preferably made of a piezoelectric material such as lithium niobate, in one example. The substrate 36 can be manufactured entirely of the piezoelectric material, or the piezoelectric material can be deposited upon or bonded to a different secondary substrate material, in examples.

Typically, the substrate 36 includes an array of SAW modulators, arrayed next to each other, side-by-side, extending into the plane of the figure.

The illustrated SAW modulator 32, as with the other modulators in the substrate 36, includes an interdigital transducer (IDT) 24 and at least one waveguide 48. The IDT 24 is typically patterned upon the proximal surface 19 of the substrate 36. The waveguides 48 are typically formed within the substrate, such as by proton-exchanged ion channel or laser micromachined region.

Each waveguide can transmit one, several, or a continuum of wavelengths. In one example, the multiple waveguides formed within the substrate 36 might be configured for different wavelengths of light, such as red, green and blue for a visual display system, such as a holographic display.

There are three common light emission configurations of the SAW modulator 32 in terms of how the light exits the modulators. The three configurations are: light exiting from a surface (16 or 19) that is principally parallel to the waveguide (face-fire), light exiting from a surface (17) that is perpendicular to the waveguide (edge-fire), and intermediate cases.

The illustrated example shows a face-fire configuration. When employing this configuration, the SAW modulator 32 also preferably includes a reflective diffraction grating 50. In the illustrated example, the reflective diffraction grating 50 is bonded to, patterned into or formed upon the face of the substrate 36 that is opposite the waveguide 48. This placement of the reflective diffraction grating 50 enables light that exits the waveguide 48 to be reflected out of the system 10 at face 19, which is proximal to the waveguide 48.

In the particular exemplary light steering system 10, a source of illumination such as an optical source module 40 provides light signals 26 to the SAW modulator 32. An in-coupling prism 18 is placed upon the surface 19 of the SAW modulator 32 and couples the light signals 26 into the optical waveguide 48. Other coupling mechanisms can be used, however. A short list includes butt-coupled fibers, in-coupling gratings and in-coupling of free space propagating light. The optical source module 40 is often a laser such that the light signals 26 are of the same or narrow range of wavelengths.

In operation, an RF signal generator 25 connects to the IDT 24. An RE drive signal 15 generated by the RF signal generator 25 is applied to the IDT 24 through intervening RE feedlines. Due to the piezoelectric properties of the substrate 36, the RF drive signal 15 causes the IDT 24 to induce a surface acoustic wave (SAW) 22 traveling chiefly through the waveguide 48.

Within the waveguide 48, the light signals 26 interact with the SAW 22. In a common configuration, the diffraction of the waveguide light 26 by the SAW 22 converts part of the light to transverse magnetic (TM) polarization. Due to birefringence of the waveguide 48 and the substrate 36, and/or a wavenumber change due to SAW diffraction, the TM polarized light signals are in leaky mode(s) of the waveguide 48. Light of the leaky modes enters the bulk substrate 36 as diffracted light 46 at diffraction angle φ, relative to grazing 77.

These light signals 46 propagate within the substrate 36 generally in a direction indicated by reference A. The light signals 46 can typically then be transmitted out of the SAW modulator 32 according to any of paths B, C, or D. However, there are different design challenges associated with getting the light signals 46 to traverse the different paths B, C, or D.

Designing the SAW modulator 32 to transmit the light signals 46 along path B, towards an edge face of the SAW modulator 32, is generally straightforward. See U.S. application Ser. No. 15/989,437, filed on May 25, 2018, entitled "SAW Modulators with Phase and Angle Selective Optical Coatings" for more details. Light will tend to follow path B without any intervention because light along path A strikes the face 16 near grazing (e.g. 70 degrees from normal) and is reflected due to TIR.

In general, transmission of the light signals 46 along paths C and D tends to be more challenging, however. There is a large difference between the index of refraction of the substrate, n[1], and the index of refraction of the surrounding medium, n[2], which is typically air, where n[1]> n[2]. This index difference imposes a narrow TER exit cone at the exit face/air boundary within which the light signals 46 can be emitted from the substrate 36. As a result, the designer must typically add a diffraction grating 50 to the distal face 16 to transmit the light signals 46 along either of paths C and D.

For example, for SAW modulator 32 constructed of lithium niobate, the diffracted light signals 46 leave the waveguide 48 at an angle of, for example, approximately 20° from the waveguide axis, grazing 77. The light signals 46 then approach the distal face 16 at angle α, which is approximately 70° from normal 78.

Depending on whether the diffraction grating 50 is transmissive or reflective to the light, the light signals 46 are directed along paths C and D, respectively. To transmit the light signals 46 along path D, for example, reflective diffraction grating 50 is employed to redirect the light signals 46 back through the substrate 36 and towards the proximal surface 19. The reflective diffraction grating 50 redirects the light signals 46 at an angle that is normal (or nearly normal) to the proximal surface 19, thus enabling transmission of the signals 46 out of the SAW modulator 32 via proximal surface 19 at exit angle θ after some refraction at the face 19. For transmitting the light signals 46 along path C, a transmissive diffraction grating 50 is constructed to redirect the light signals 46 at an angle that is normal (or nearly normal) to the distal surface 16 for transmission along path C.

Nevertheless, in either of these two configurations, the optical redirection capability is still largely dictated by the bandwidth of the RF signal generator 25 and the refractive index mismatch between the ambient environment and the substrate 36.

Figure 2A:
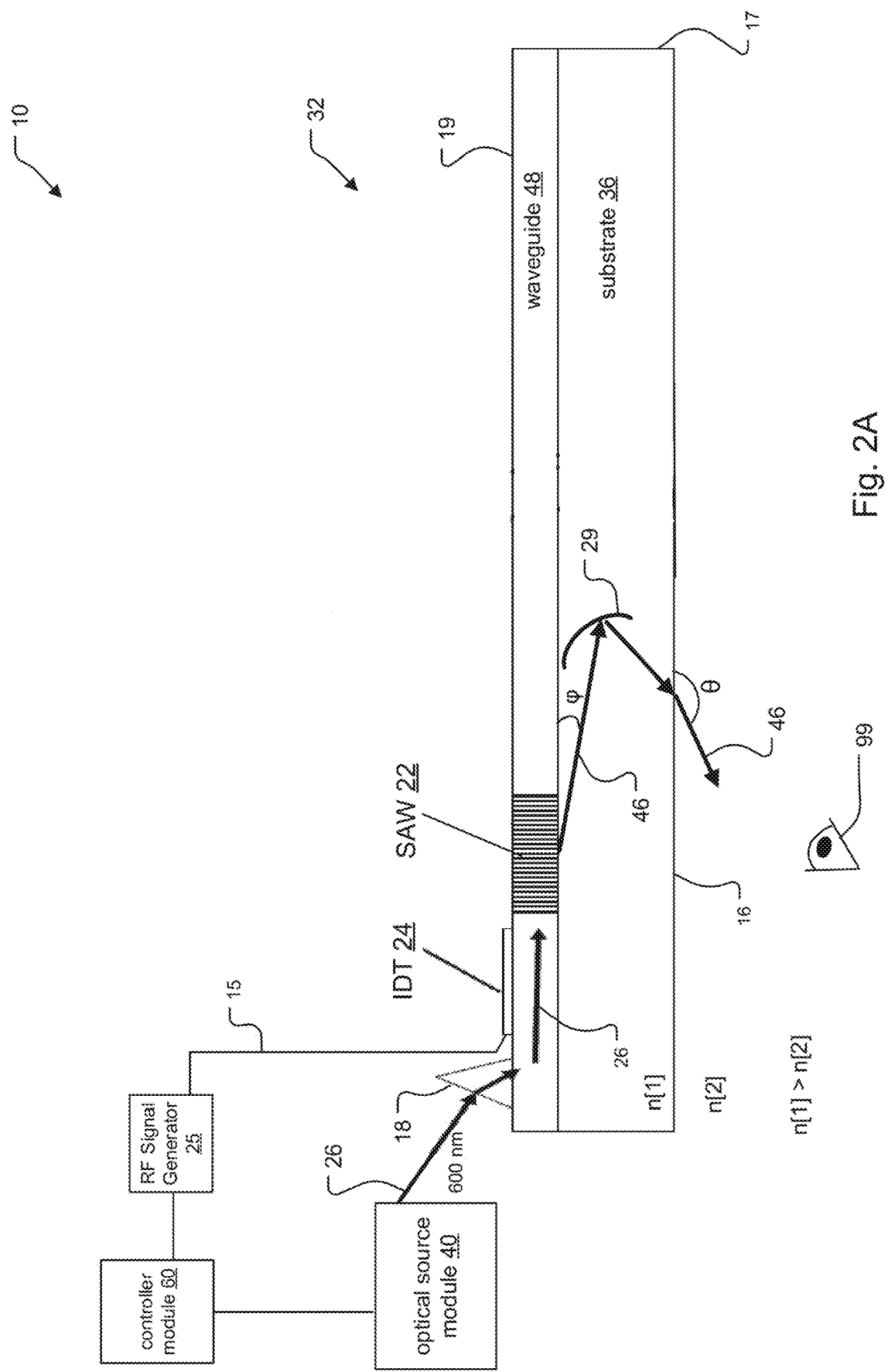
FIG. 2A is a schematic side view of a leaky-mode SAW modulator including a concave optical power component that is embedded within a substrate of the SAW modulator, showing a ray path of light incident upon a distal portion optical power component and exiting out the distal face of the modulator.

FIG. 2A shows a SAW modulator 32 that incorporates an optical power component 29 that is embedded within the substrate 36, which can be used to effectively amplify the optical redirection capability. The illustrated optical component has a concave curvature to provide a positive dioptric power.

As before, typically, the substrate 36 includes an array of SAW modulators, arrayed next to each other, side-by-side, extending into the plane of the figure. In the typical substrate, there would be more than 3-5 modulators. At higher levels of integration, possibly 10, 20, or 50 or more modulators are formed in the substrate 36.

The optical power component 29 is a reflective embedded concave surface such as: 1) a mirrored surface embedded in the substrate 36, 2) a volume grating fabricated in the substrate 36, or 3) a volume holographic element having the function of a concave mirrored surface in the substrate 36. When arrays of SAW modulators are integrated side-by-side, the optical power component 29 takes the form of a curved surface such as a paraboloid cylindrical or hyperbolic surface. The surface extends into the plane of the page so that one element functions as a powered element of each of the side-by-side modulators integrated into the common substrate 36.

That said, in other embodiments, the profile of the optical powered element 29 varies in a direction perpendicular to the plane of the page, e.g. with a twist. Thus, the optical powered element 29 provides a different, orthogonal axis of beam steering for the different modulators in the substrate 36. This is useful as a full-parallax display rather than a horizontal-parallax-only display.

The volume grating or the volume holographic element are typically fabricated by femtosecond laser writing or by holographic methods (for example, if the substrate or a portion of the substrate 36 is photorefractive), in examples. As such, the volume grating and the volume holographic element might in fact occupy a rectangular volume within the substrate. For reference, one of the original articles on the theory behind volume gratings is authored by Kogelnik, H, and entitled "Coupled Wave Theory for Thick Hologram Gratings." Bell System Technical Journal, 48(9), 2909-2947, November 1969. A more recent paper describing a useful computational method to design diffractive optical power components is authored by Zhou, G., Chen, Y., Wang, Z., &. Song, H. (1999), and entitled "Genetic Local Search Algorithm for Optimization Design of Diffractive Optical power components." Applied Optics, 38(20), 4281; 1999. A paper on curved diffraction gratings (i.e. could guide design of grating based reflectors with power) is authored by Wilson, M. G. & Bone, M. C. (1980), and entitled "Theory of curved diffraction gratings," IEEE Proceedings, 127(3), 127-132.

However created and whatever type, the optical power component 29 redirects rays of the diffracted light signals 46 that are incident upon the surface of the optical power component 29 with a greater angular extent than the planar reflective diffractive grating discussed earlier. As a result, in many cases, the optical power component 29 can redirect the light signals 46 to be aligned either normal to or nearly normal to an exit face, such as the distal surface 16. This enables direct transmission of the signals 46 out of the distal surface 16 and to the observer 99, thus eliminating or reducing the need for additional optical structures (such as a transmissive diffractive grating 50 in FIG. 1) to provide the same function.

The optical power component 29 is preferably designed to have a shape and optical power to change the optical path of the light signals 46 and thus the exit angle θ with relatively small changes in the spatial frequency of the SAW 22/frequency of the RF drive signal 15 and thus diffraction angle φ. In the illustrated example, the rays of the light signals 46 are incident upon a bottom portion of the optical power component 29. In response, the optical power component 29 directs the light signals 46 downward and rearward towards the bottom surface 16. On the other hand, when rays of the diffracted light signals 46 are incident upon a middle or upper portion of the optical power component 29, the light is reflected closer to normal to the bottom surface 16 and possibly angled toward the end face 17. Thus, in one case, the exit light angle θ varies over a range of greater than 45 degrees and possibly by more than 90 degrees with the frequency changes in the RF drive signal 15.

The optical power component 29 redirects the light signals 46 at an angle that is closer to normal or nearly normal to the distal surface 16 in many cases. This eliminates the need for the diffraction grating 50 shown in FIG. 1 to ensure that light is coupled out of the substrate 36. Each optical power component 29 embedded within and/or placed upon each SAW modulator 32 forms a notional pixel of a display device, in one example.

Figure 2B:
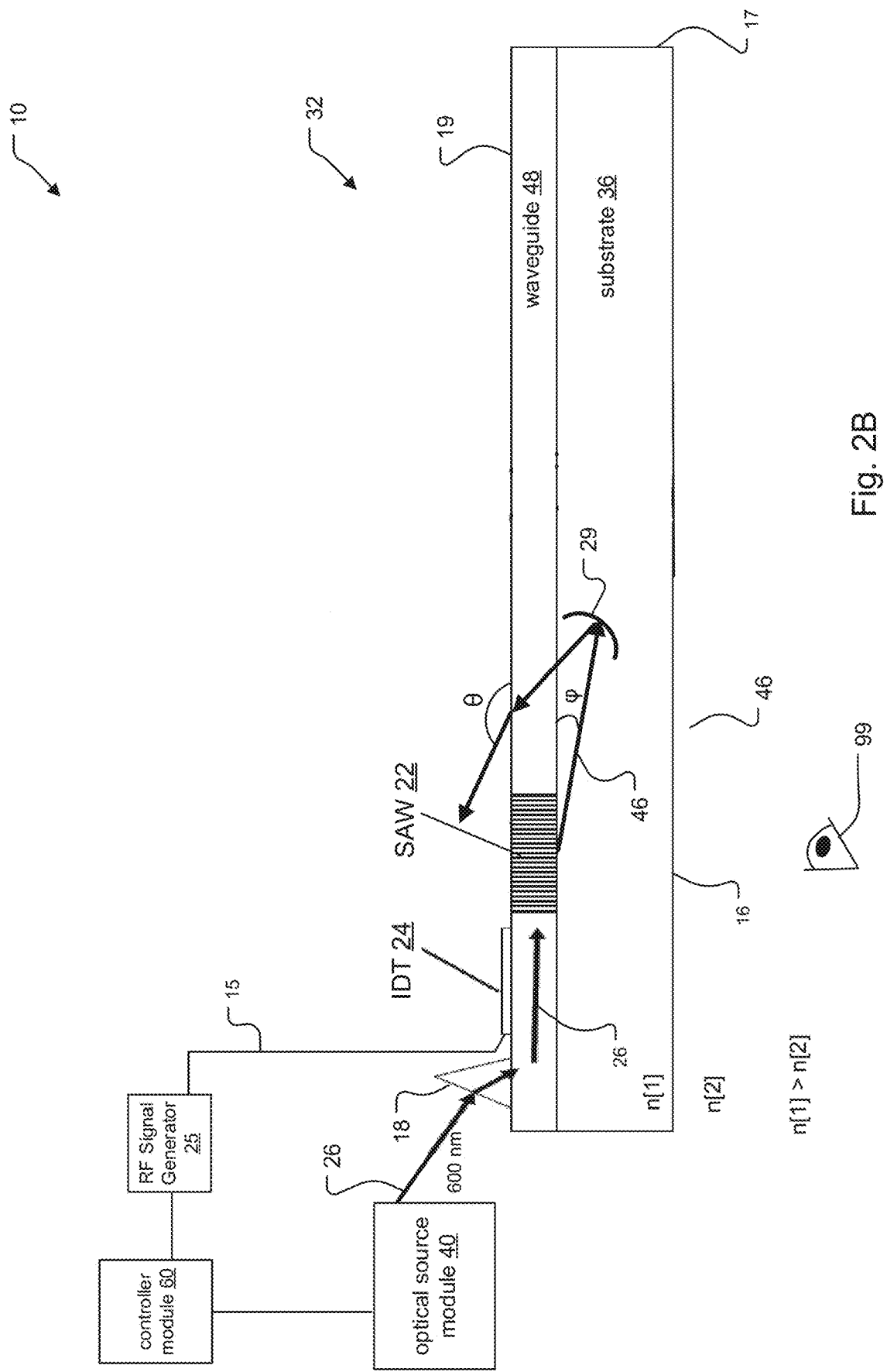
FIG. 2B is a schematic side view of a leaky-mode SAW modulator including a concave optical power component that is embedded within a substrate of the SAW modulator, showing a ray path of light incident upon the optical power component and exiting out the proximal face of the modulator.

FIG. 2B shows another SAW modulator 32 that incorporates an optical power component 29 that is embedded within the substrate 36. In this example, the optical power component is oriented to reflect the diffracted light 46 out of the proximal face 19.

Figure 3:
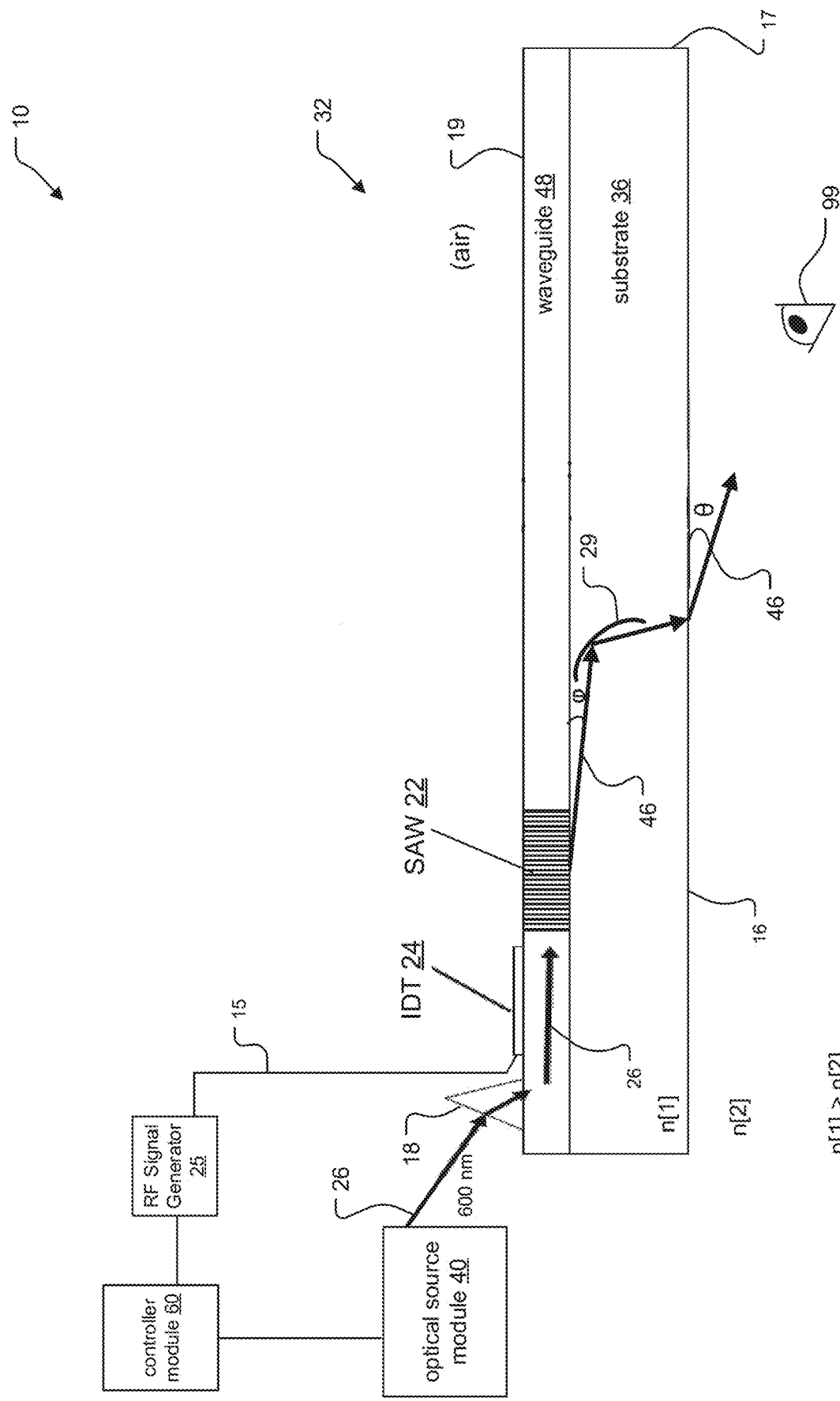
FIG. 3 is a schematic side view of a SAW modulator including the embedded concave optical power component, showing a ray path of light incident upon a proximal portion of the optical power component.

FIG. 3 shows the path of the diffracted light signals 46 within and from the substrate 36 when a ray is incident on the "top" of the reflective concave optical power component 29.

Here, the light signals 46 incident upon the top of the optical power component 29 are reflected at a greater angle by the optical power component 29 than in FIG. 2, As a result, the direction of the light signals 46 upon exiting the SAW modulator 32 is different than in FIG. 2. This large change in the direction (θ ranging from obtuse to acute) between FIGS. 2A and 3 can be achieved with a modest change in the SAW/RF drive signal frequency, which is generally a desirable characteristic.

Figure 4A:
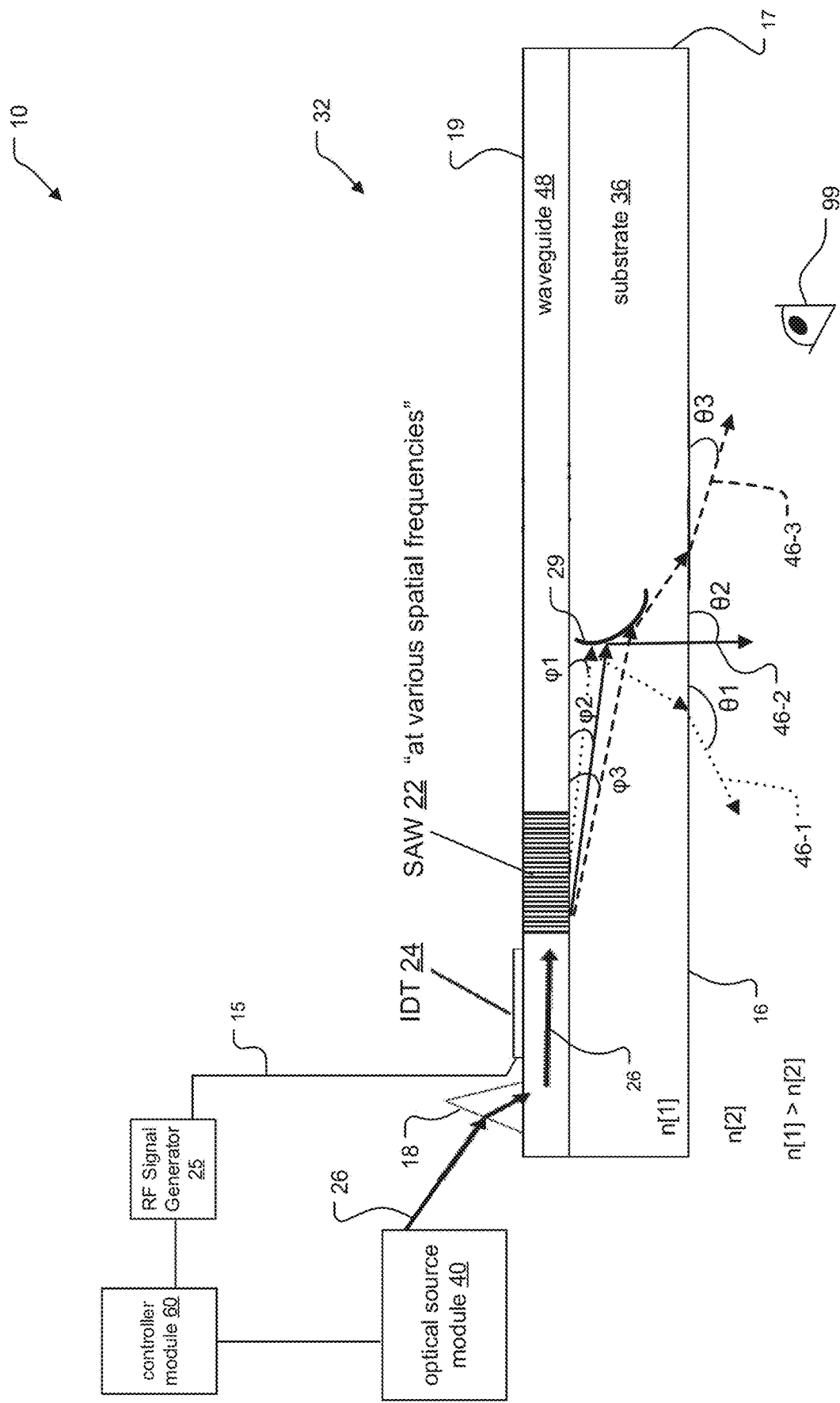
FIGS. 4A and 4B are schematic side views of SAW modulators including embedded convex optical power components, showing how varying the spatial frequency of the SAW affects the output optical signals through the distal or proximal faces, respectively.

FIG. 4A shows a SAW modulator 32 that incorporates an embedded optical power component 29 that has a convex curvature to provide a negative dioptric power and shows how the exit light angle varies with changes in the frequency of the RF drive signals 15.

By modulating the frequency of the RF drive signals 15, the diffraction angle of the light signals 46 transmitted out of the SAW modulator 32 varies between φ1 to φ2 to φ3, which is a relatively small angular range. As is known in the art, the illumination profile, or a fan of light formed by the diffracted light signals 46, is dictated by the properties of the induced SAW 22 and can thus be regulated to produce the desired output light field. Specifically, the controller module 60 generates the RF drive signals 15 with three frequencies such as low, medium, and high frequency values of the RF drive signals 15, as shown. These frequencies might be generated serially in time or as different frequency components of a single drive signal. The resulting three different spatial frequencies for the SAW 22 are then produced within the waveguide 48 for each of the three frequencies of the RF drive signals 15.

The change in spatial frequency of the SAW 22 correspondingly changes the locations at which the diffracted light signals 46 are incident upon the optical power component 29, assuming that the SAWs interact with the light signals 26 at the same position along the waveguide 48. The different locations are indicated by where the different light signals 46-1, 46-2, and 46-3 impinge on the optical power component 29. The light signals 46 are then reflected by the optical power component 29.

Each of the light signals 46-1, 46-2, and 46-3 are transmitted out of the SAW modulator 32 in different directions, as shown. Each of the signals 46-1/42-2/46-2 are transmitted in different directions, as a function of the local spatial frequency components of the SAW 22 that contributed to the formation of the light signals 46-1, 46-2, and 46-3. As a result, modulation of the RF drive signals 15 can "steer" the light signals 46 transmitted out of the SAW modulator 32 in different directions and over a wide range of θ.

Additionally and/or alternatively, the SAW 22 created within the waveguide 48 might have a continuously varying frequency, such as a frequency ramp. This can broaden the footprint of light signals 46 emerging with the same angle. This can also provide a continuous, rather than a discrete collection, and optionally amplitude-modulated, fan of exit light.

In this example, the embedded optical power component 29 has the convex curvature that provides a negative dioptric power. As a result, an even wider angular extent of light signals emitted from the SAW modulator is achieved.

Specifically, the optical power component 99 typically has a paraboloid, cylindrical, or hyperbolic surface profile, which extends into the plane of the page. Thus, when the substrate 36 includes an array of the side-by-side modulators, the same optical power component reflects the light from the different modulators.

Figure 4B:
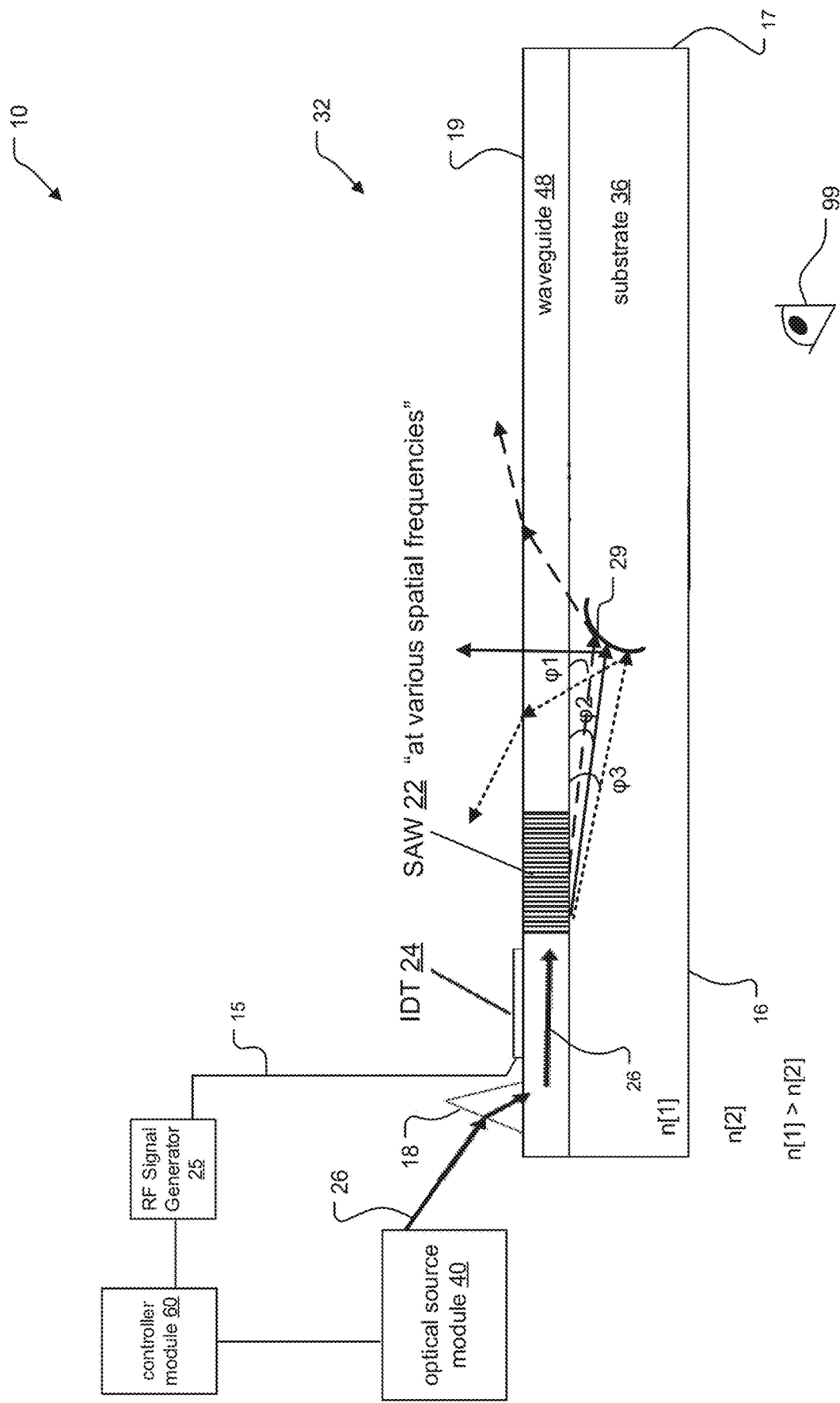

FIG. 4B shows a related embodiment in which the optical power component 99 is rotated, relative to FIG. 4A, to direct the optical signals to exit the proximal face 19.

Figure 5:
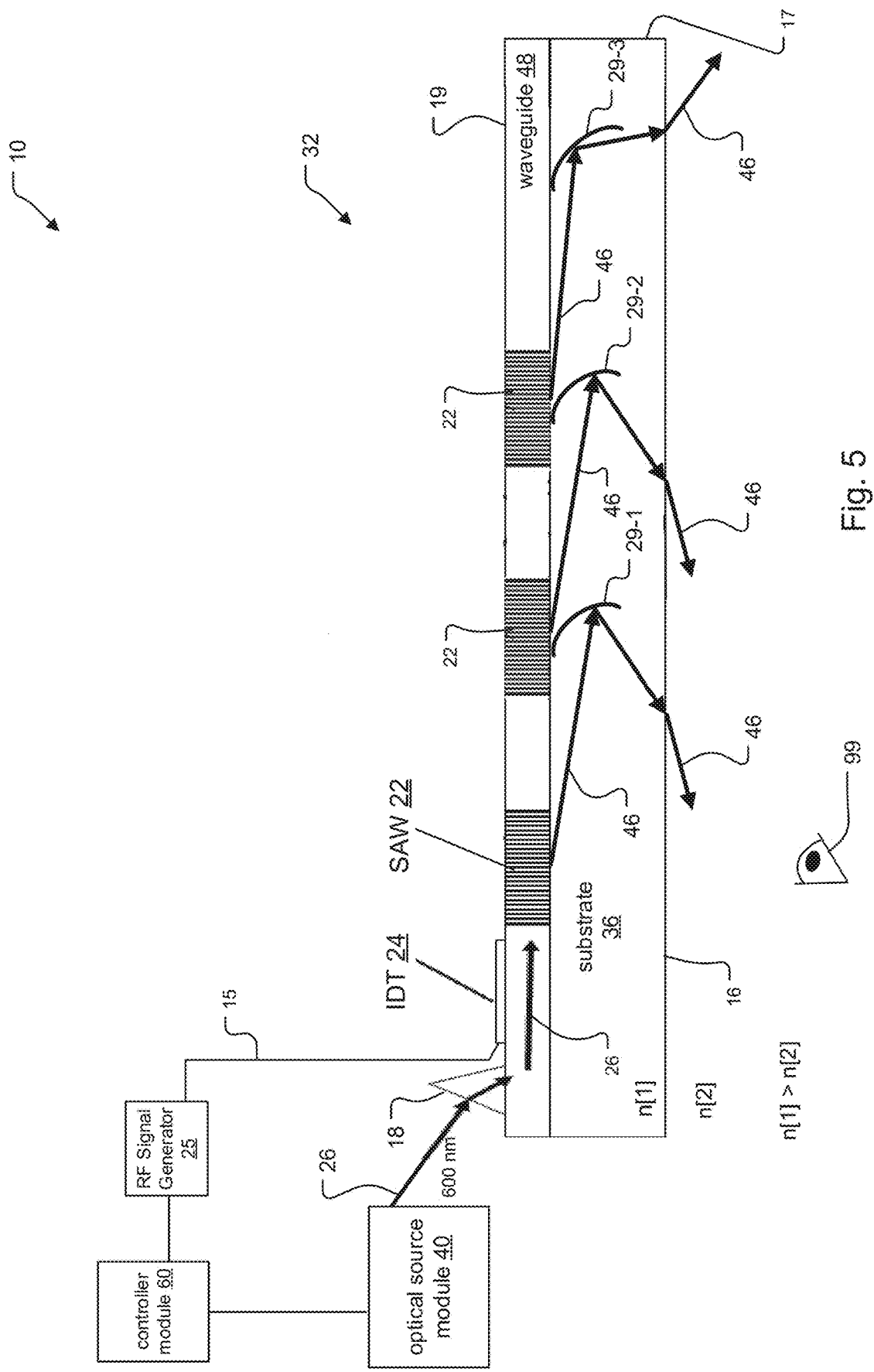
FIG. 5 is a schematic side view of a SAW modulator including three concave optical power components distributed along the length of the waveguide, showing a ray path of light incident upon the components.

FIG. 5 shows another embodiment of a SAW modulator 32. The system 10 incorporates multiple optical power components 29-1, 29-2, and 29-3. The optical power components 29 are embedded within the substrate 36 at different locations along the length of the SAW modulator 32. While the example shows concave optical components 29-1, 29-2, and 29-3 with positive dioptric power, convex optical components 29-1, 29-2, and 29-3 with negative dioptric power would be used in other examples. Another example has combinations of convex and concave optical components such that optical components 29-1, and 29-3 are convex and optical component 29-2 is concave, or vice versa. And in still further combinations, the optical components 29-1, 29-2, and 29-3 are rotated from their illustrated orientations in still other embodiments to direct the light to exit out the proximal face 19.

Moreover, using this design, an optical designer can "tile" or pixelate the entire length of an exit face of the SAW modulator 32. In operation, the controller module 60 coordinates the instantaneous locations of the SAWs 22 as they travel along the length of the waveguide 48 with the locations of and spacing between the optical power components 29-1, 29-2, and 29-3. In this way, an exit face such as the distal surface 16 of the SAW modulator can effectively be partitioned into notional pixels.

FIG. 6A shows yet another embodiment of a SAW modulator 32, Unlike the embodiments described thus far, the system 10 incorporates an optical power component 29 that is formed on an optically curved surface. The surface is fabricated into the substrate 36, and possibly coated with a metal or dielectric mirror layer. In the illustrated example, the curved surface is fabricated into an end face 17 of the modulator's substrate 36.

In other examples, the optical power component might be placed/mounted on a surface of the SAW modulator 32 such as the distal face 16, Such surface optical features may be created by sawing, lithography, embossing, or other methods.

In other examples, the optical power component 29 is a diffractive element.

Figure 6B:
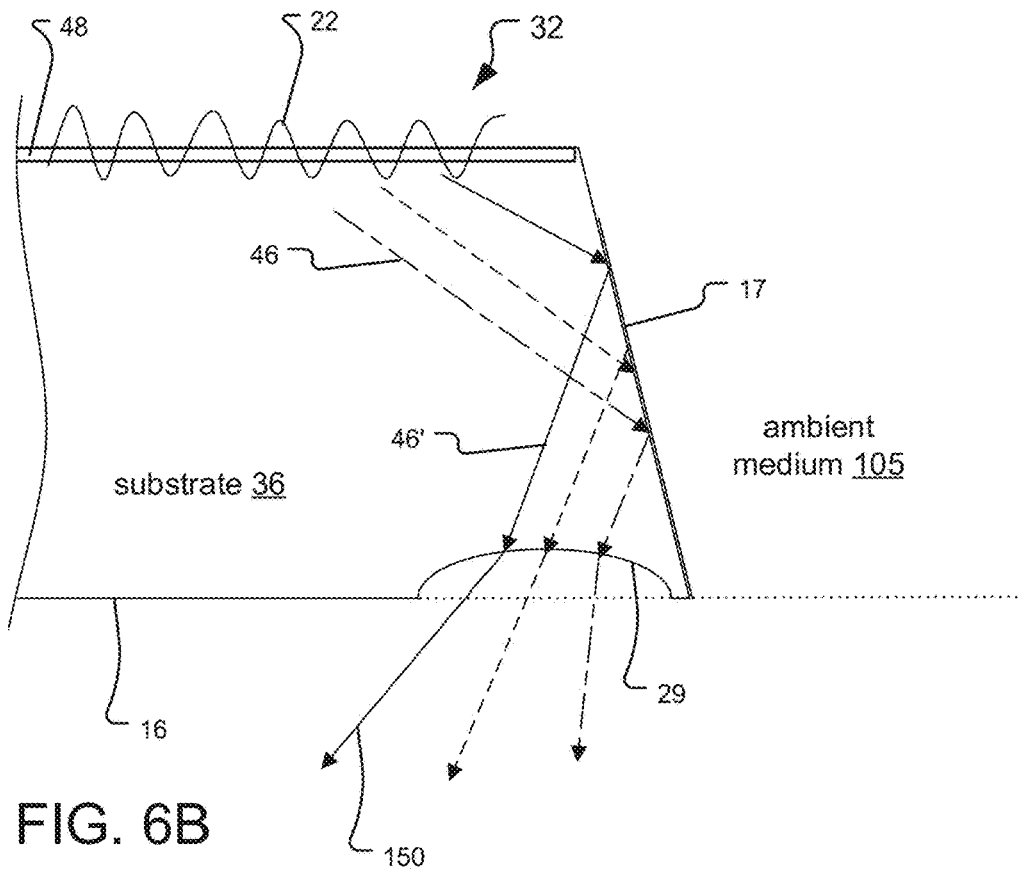
FIGS. 6B and 6C show schematic side views of portions of other SAW modulators that include powered refractive optical components, such as concave and convex lenses, to increase the deflection angle, and convex optics.

For example, in FIG. 6B a transmissive optical power component 29 is a surface formed by removing material from the lithium niobate substrate 36 at the distal face 16 as an exit face to create a concave optical power component. The curved optical surface provides diverging optical power, thereby broadening the angular extent of the diffracted light 46. In other examples, optical elements that provide the optical power might be placed upon an exit face, patterned flat on a surface such as an exit face, and included as part of a later optical train.

Figure 6C:
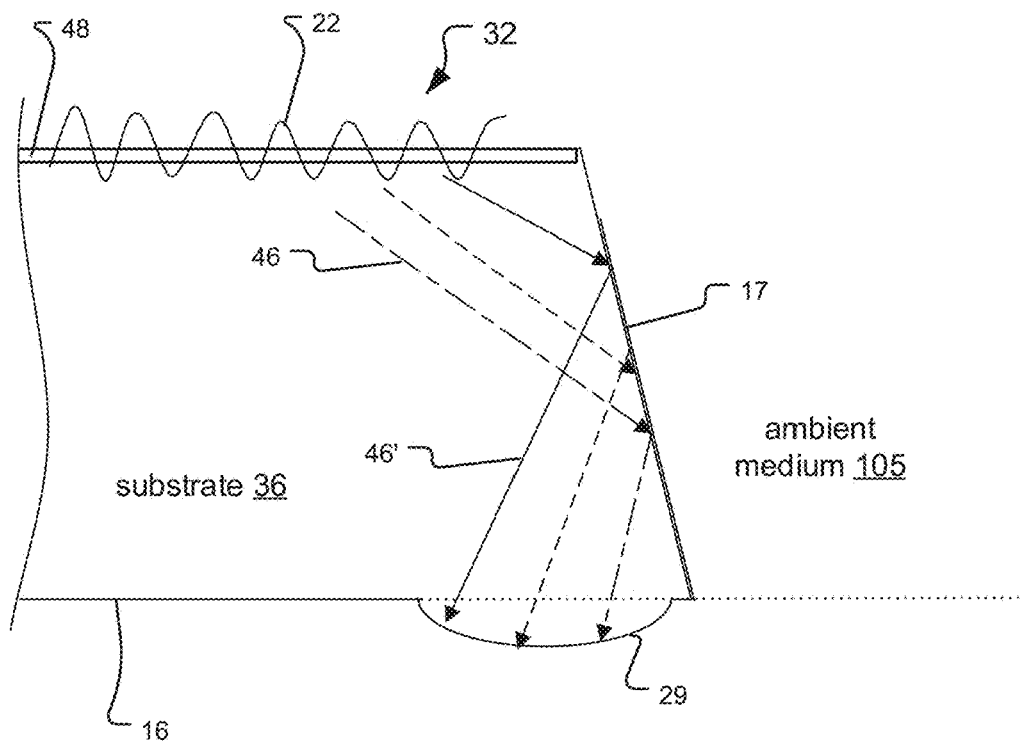

FIG. 6C is another example of a transmissive optical power component 29, Here, the component 29 is formed by adding material to the lithium niobate substrate 36 at the distal face 16 as an exit face to create a convex optical surface.

Figure 7:
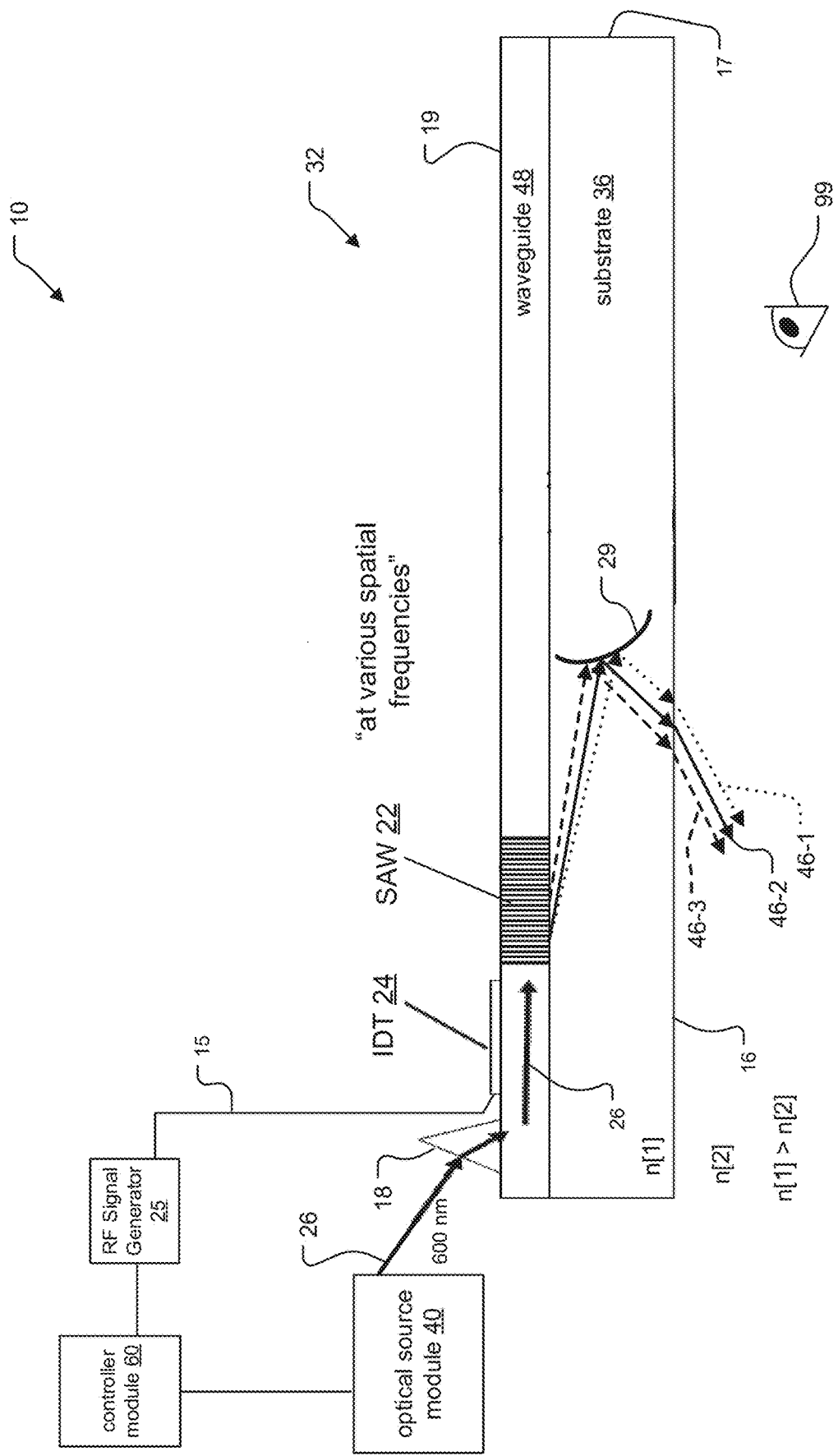
FIG. 7 is a schematic side view of a SAW modulator including an embedded convex optical power component, illustrating operation of the light field generator system when changing the frequency of the SAW.

FIG. 7 shows another embodiment of a SAW modulator 32. This modulator has an embedded optical power component 29 that is convex. The effect of varying the frequency of the RF drive signals 15 applied to the system 10 is also shown.

In the illustrated example, RF drive signals 15 of three different frequencies are applied to the IDT 24 of the SAW modulator 32, either sequentially or simultaneously. In response, light signals 46-1, 46-2, and 46-3 are emitted from the SAW modulator 32 at similar directions but displaced along the distal face 16. Thus, with a convex element in conjunction with the appropriate RF signals 15, the "footprint" for a given angle can be broader at exit.

Figure 8:
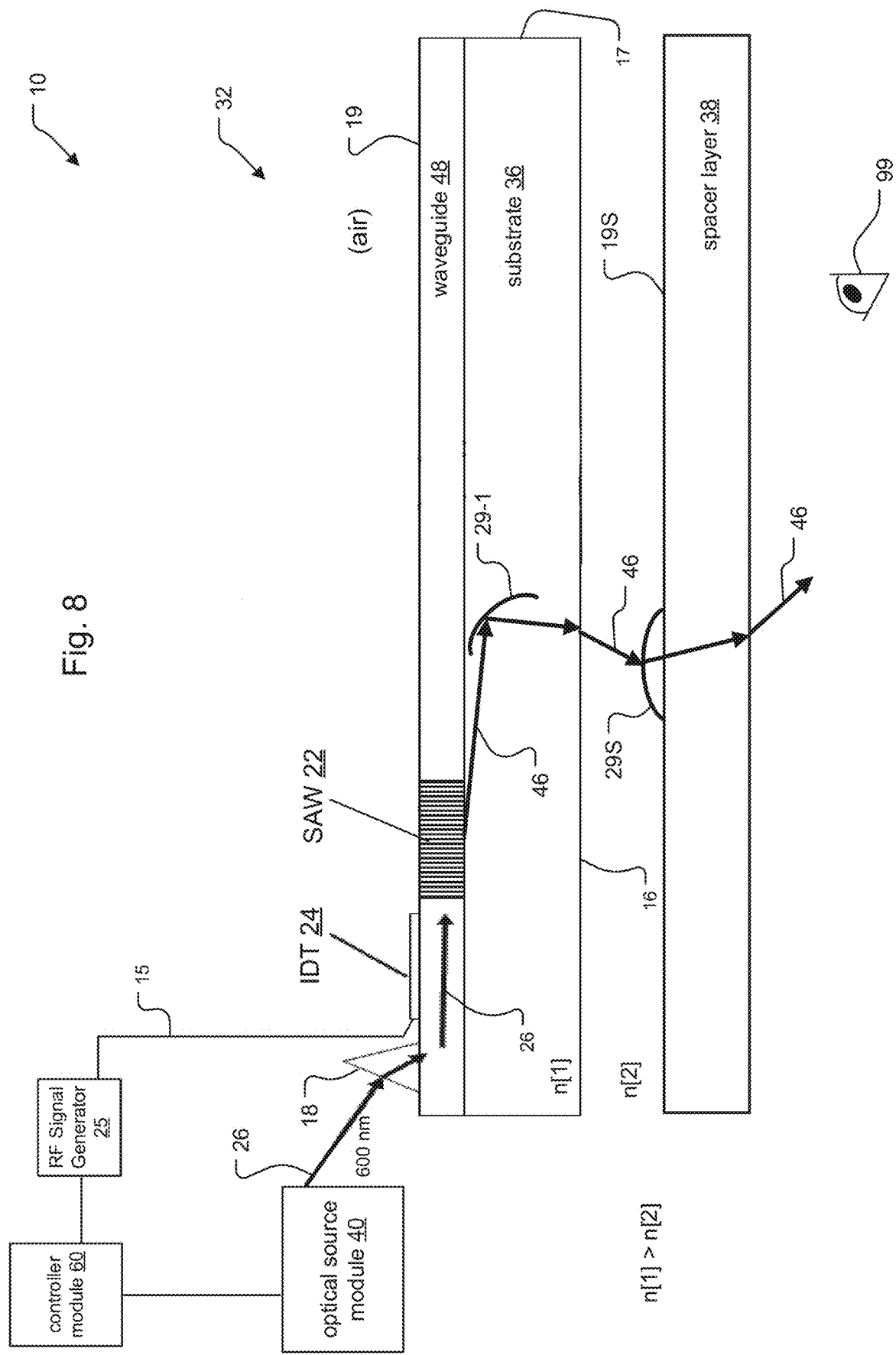
FIG. 8 is a schematic side view of a SAW modulator including an embedded concave optical power component along with a spacer layer placed adjacent to a SAW modulator substrate, which carries a refractive lens optical power component.

FIG. 8 shows another embodiment of a SAW modulator 32. This modulator incorporates two optical power components. The second optical power component 29S is formed on, attached to, or fabricated in a spacer layer 38. Here, the second optical power component 29S is placed adjacent to proximal surface 19S of the spacer layer 38. According to one fabrication approach, the spacer layer is epoxy bonded to the substrate 36 using a low refractive index epoxy.

In the illustrated example, spacer layer 38 is aligned to be parallel with the axis of waveguide 48, and is placed below the distal surface 16 of the SAW modulator 32. The spacer layer is preferably formed from a transmissive material such as glass.

In the specific illustrated embodiment, the first optical power component 29-1 is a concave mirror, embedded within the substrate 36 of the SAW modulator 32. The second optical power component 29S is a refractive microlens that is placed upon a proximal surface 19S of the spacer layer 38.

In one implementation, the first and second optical power components form a notional "telescope array" for increasing the angular extent of the light signals 46 emitted from the SAW modulator 32, as disclosed in U.S. Provisional application Ser. No. 16/041,040, filed on Jul. 20, 2018, entitled "Telescope Arrays and Superimposed Volume Gratings for Light Field Generation."

The optical power components 29 discussed in the previous embodiments (e.g., FIGS. 2A, 2B, 3, 4A, 4B, 5, 6A, 6B, 6C, 7, and 8 and following FIGS. 9 and 10) can cover a wide range of power. The components 29 typically have a power of +/−1000 diopters, but the power is conceivably in the range +/−100 to +/−10,000 diopters, or much less than 100 diopters if the image depth is centered at a plane much different than the plane of the device.

Figure 9:
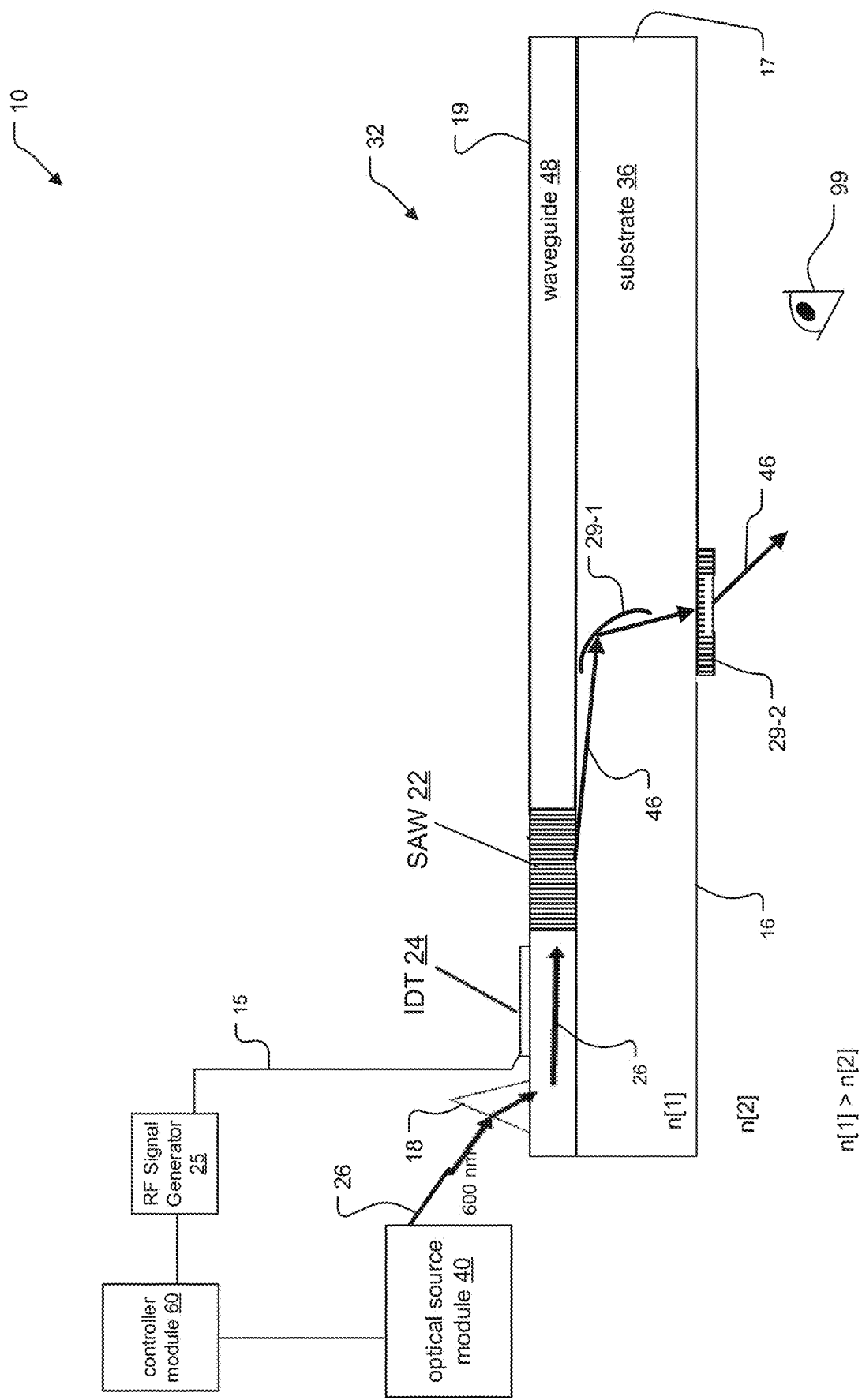
FIG. 9 is a schematic side view of a SAW modulator including an embedded concave optical power component along with a diffractive optical power component on a distal/exit face of the substrate.

FIG. 9 shows another embodiment of a SAW modulator 32 with two optical power components 29-1, 29-2.

The first optical power component 29-1 is embedded within the substrate of the SAW modulator 32. The second optical power component 29-2 is a diffractive lens that is placed upon, mounted to, or fabricated in the distal surface 16.

In some cases, the first optical power component 29-1 by itself may not be able to align the light signals 46 with sufficient accuracy. Thus, the inclusion of the second optical power component 29-2 can simplify the design of and tolerance for other optical components.

For example, diffracted light signals 46 that are incident upon extreme proximal/distal edges of the first optical power component 29-1 are reflected at a lesser angular extent than signals that strike near the center of the first optical power component 29-1. However, the first optical power component 29-1 still provides some redirection of the light signals 46. As a result, any additional optical structures, such as the second optical component 29-2, will typically require less resolving power, as compared to similar optical structures mounted near exit faces of SAW modulators 32 that lack optical power components.

Figure 10:
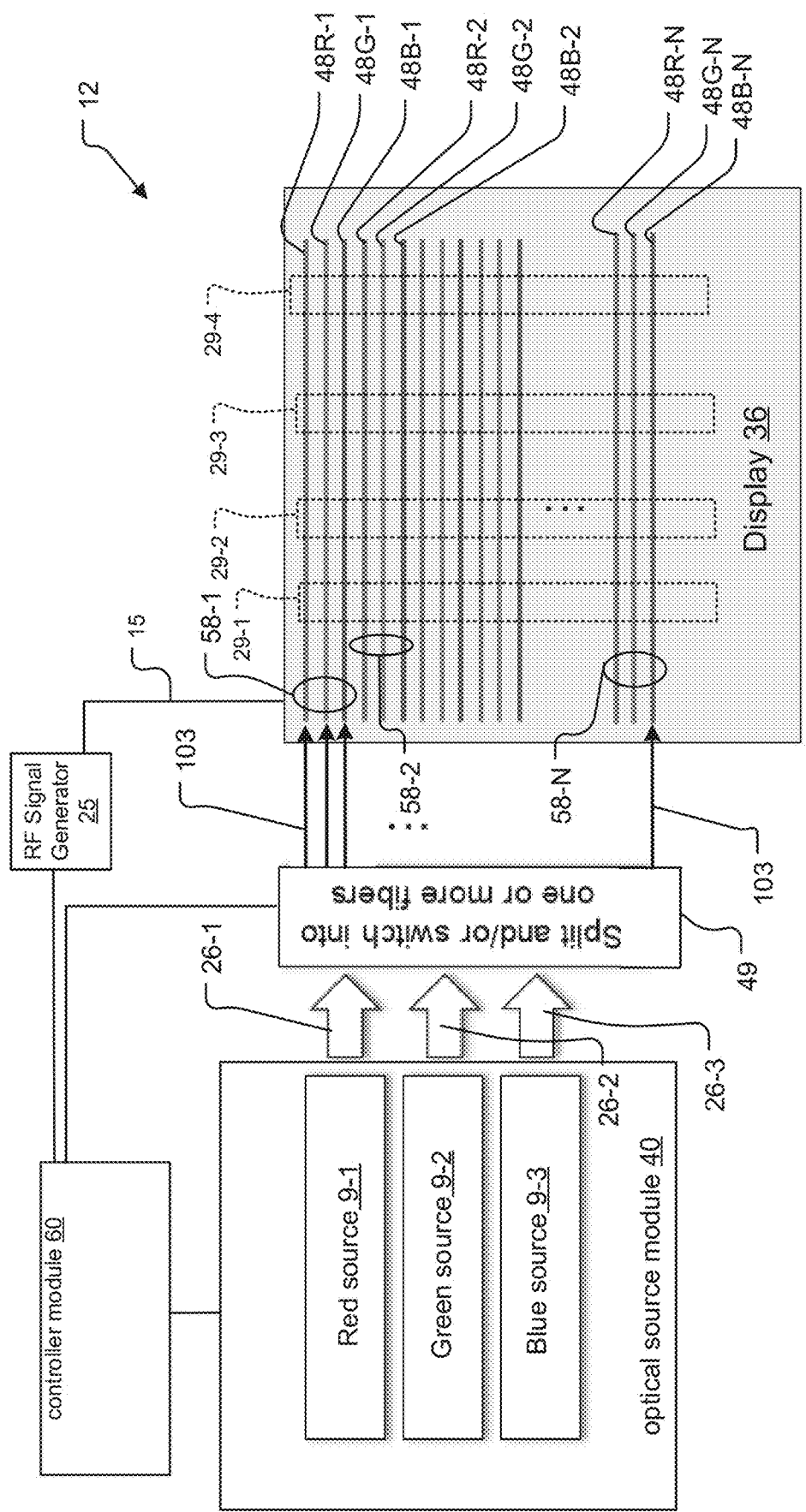
FIG. 10 is a schematic block diagram of a Red/Green/Blue (RGB) light field generator system utilizing the previously disclosed SAW modulators.

Finally, FIG. 10 shows how the previously-described SAW modulators might be utilized in an RGB light field generator system 12 and integrated side-by-side in a common substrate 36.

The RGB light field generator system 12 includes the controller module 60, the optical source module 40, the RF signal generator 25, an optional splitter/switch 49, and the substrate 36 as might be used as a component of a display system. The optical source module 40 includes three sources 9-1, 9-2, and 9-3, respectively providing red, green, and blue light according to one primary color pallet. The optical source module 40 and the splitter/switch 49 are under control of the controller module 60.

The substrate 36 includes waveguides 48 that are fabricated to accept and transmit light signals 26 of either red (26-1), green (26-2), or blue (26-3) wavelengths. In the illustrated example, waveguides 48 are arranged in waveguide banks 58-1 . . . 58-N. For example, waveguide bank 58-1 includes three waveguides 48R-1, 48G-1, and 48B-1. Waveguides 48R-1, 48G-1, and 48B-1 are respectively fabricated for red light signals 26-1, green light signals 26-2, and blue light signals 26-3. Preferably, the waveguides 48 are formed within SAW modulators 32 and are constructed and operated in accordance with the previously disclosed embodiments.

The extent and location of the optical power components 29-1 to 29-4 is also shown. In this case, the optical power components 29-1 to 29-4 extend across the array of waveguides.

The light field generator system 12 generally operates as follows. Light signals 26 from the optical source module 40 enter the splitter/switch 49. The splitter/switch 49 splits, switches, and/or combines the light signals 26 such that the light signals 26 enter the waveguides 48 within the waveguide banks 58. The splitter/switch 49 typically connects to the waveguides via fiber connections 103. The splitter/switch 49 then routes the light signals 26 to the waveguides 48 within each of the waveguide banks 58, based on the wavelengths of the light signals 26. For example, the splitter/switch 49 routes red light signals 26-1 to waveguide 48R-1 in waveguide bank 58-1, 48R-2 in waveguide bank 58-2, and to 48R-N in waveguide bank 58-N. At the same time, the RF signal generator supplies RF drive signals to the IDTs (not shown) for each of the waveguides 48.

While this invention has been particularly shown and described with references to preferred embodiments thereof, it will be understood by those skilled in the art that various changes in form and details may be made therein without departing from the scope of the invention encompassed by the appended claims.

What is claimed is:

1. A SAW modulator, including:
   a first optical power component;
   a substrate, in which the SAW modulator is fabricated;
   a radio frequency drive circuit for providing radio frequency drive signals to the SAW modulator; and
   a SAW transducer on a proximal face of the substrate that is driven by the radio frequency drive signals; and
   a second optical power component that receives light from the first optical power component.

2. The modulator of claim 1, wherein the first optical power component is embedded within a substrate of the SAW modulator.

3. The modulator of claim 1, wherein the first optical power component has the function of a concave mirror.

4. The modulator of claim 1, wherein the first optical power component is a volume grating or a volume holographic optical element.

5. The modulator of claim 1, wherein the first optical power component directs light out of a distal face of the modulator.

6. The modulator of claim 1, wherein the first optical power component directs light out of a proximal face of the modulator.

7. The modulator of claim 1, wherein the first optical power component has a power in the range of +/−100 to +/−10,000 diopters.

8. The modulator of claim 1, wherein the second optical power component is held on a spacer layer that is adjacent to the substrate.

9. The modulator of claim 8, wherein the spacer layer is bonded to the substrate.

10. The modulator of claim 8, wherein the spacer layer is bonded distal face of the substrate, which is opposite the proximal face.

11. The modulator of claim 1, wherein the second optical power component is a diffractive lens on a distal face of the substrate.

12. The modulator of claim 1, further comprising two or more optical power components located along a length of the modulator.

13. The modulator of claim 1, further comprising a multi wavelength optical source that generates light over a range of wavelengths for input into the optical modulator.

14. A SAW modulator, including:
    at least one optical power component;
    a substrate, in which the SAW modulator is fabricated;
    a radio frequency drive circuit for providing radio frequency drive signals to the SAW modulator; and
    a SAW transducer on a proximal face of the substrate that is driven by the radio frequency drive signals;
    wherein exit light angles θ vary over a range of greater than 45 degrees with frequency changes in the radio frequency drive signals.

15. The modulator of claim 14, wherein the exit light angles θ vary over a range of greater than 90 degrees with frequency changes in the radio frequency drive signals.

16. The modulator of claim 14, wherein the optical power component extends across the substrate.

17. A SAW modulator, including:
    at least one optical power component;
    a substrate, in which the SAW modulator is fabricated;
    a radio frequency drive circuit for providing radio frequency drive signals to the SAW modulator; and
    a SAW transducer on a proximal face of the substrate that is driven by the radio frequency drive signals;
    wherein the optical power component directs light to exit from a distal face of the substrate, which is opposite the proximal face.

* * * * *